United States Patent [19]

Nakagawa

[11] Patent Number: 5,060,153

[45] Date of Patent: Oct. 22, 1991

[54] TELLER MACHINE WITH MODE FOR CONTINUOUSLY SENDING OFF-LINE COLLECTED TRANSACTION DATA TO A HOST WHILE IGNORING INCOMPLETE DATA RESPONSE SIGNALS

[75] Inventor: Shigemitsu Nakagawa, Yamatokoriyama, Japan

[73] Assignee: Sharp Kabushiki Kaisha, Osaka, Japan

[21] Appl. No.: 333,562

[22] Filed: Apr. 5, 1989

[30] Foreign Application Priority Data

Apr. 5, 1989 [JP] Japan ............................ 63-84839

[51] Int. Cl.$^5$ .............................................. G06F 15/21
[52] U.S. Cl. .................................................. 364/405
[58] Field of Search ................. 235/379, 380; 364/405

[56] References Cited

U.S. PATENT DOCUMENTS

| | | | |
|---|---|---|---|
| 4,114,027 | 9/1978 | Slater et al. | 235/379 |
| 4,482,802 | 11/1984 | Aizawa et al. | 235/379 |
| 4,623,964 | 11/1986 | Getz et al. | 364/401 |

FOREIGN PATENT DOCUMENTS

0147751 11/1980 Japan .
0003054 1/1985 Japan .
0237571 11/1985 Japan .

Primary Examiner—Clark A. Jablon
Attorney, Agent, or Firm—Birch, Stewart, Kolasch & Birch

[57] ABSTRACT

A transaction system where at least one teller machine, operating in an on-line mode and an off-line mode, is connected to a host computer. The teller machine can be set during the off-line mode into either of two key wait states for responding to a key wait request command from the host computer so that when a first key wait code is set, further transmission from the teller machine is prohibited until a predetermined key on the keyboard is activated, but when a second code is set, transmission is continued without the necessity of activating the aforementioned key and the transactional data can be further printed for a subsequent backup check.

6 Claims, 6 Drawing Sheets

TELLER MACHINE WITH MODE FOR CONTINUOUSLY SENDING OFF-LINE COLLECTED TRANSACTION DATA TO A HOST WHILE IGNORING INCOMPLETE DATA RESPONSE SIGNALS

BACKGROUND OF THE INVENTION

1. Field of the Invention

The present invention relates to a teller machine for processing transactions of cash, securities or the like in the counter tasks at, for example, banks and financial institutes, and also to an automatic transaction system to which a plurality of teller machines are connected, comprising a host computer for processing the transaction data transmitted from each teller machine.

2. Description of the Prior Art

In the counter tasks for registering transaction data such as account number, type of transaction and amount of transaction at banks or the like, teller machines connected to a host computer are used. On the keyboard of the teller machine, when the END key is pressed after input of the transaction data, the transaction data is registered in the teller machine, and is transmitted to the host computer at the same time. The host computer receiving the transaction data from the teller machine sends out a corresponding response signal. Some of such response signals include key wait request command requesting a key wait to the teller machine is known. When a response signal including the key wait request command is received, the subsequent transmission of the transaction data to the host computer is prohibited unless a specific predetermined key is thereafter pressed in the teller machine.

As the case of sending out such key wait request command, the following event may be assumed. One of the types of transaction data transmitted to the host computer has a format of transaction data composed of four pieces of information consisting of the transaction serial number, account number, transaction amount and transaction type. When transmitting such type of transaction data to the host computer, if the transaction data is not composed a perfect format due to, for example, missing of any one of the pieces of information (e.g. account number) by misoperation of the operator of the teller machine, the host computer does not accept this transaction data, but transmits a response signal including the key wait request command. In response to this, in the display unit of the teller machine, "REJECT" is displayed as visual information telling that the transmitted transaction data was not accepted by the host computer, and the subsequent transmission action is prohibited, and the host computer requests a key input operation to cancel this state to the teller machine. That is, this state is the key wait state. Accordingly, when the operator presses the CLEAR key, the state wherein transmission action is prohibited can be cancelled.

The teller machine can be set to a offline mode when it is desired to shorten the processing time as the customers are crowded at the counter or when the line connecting with the host computer is down. In the offline mode, when the transaction data that must be transmitted to the host computer is registered, the data is not transmitted immediately, but is temporarily stored in a re-entry buffer built in the teller machine. The data stored in the re-entry buffer are sequentially sent out to the host computer in response to various read command information transmitted from the host computer when there is a free time at the teller machine side, such as during the night. Even in the offline mode, when the key wait state occurs, the operation to cancelling such state is required, and such operation is a great burden for the operator.

SUMMARY OF THE INVENTION

It is, therefore, a primary object of the invention to present an automatic transaction system capable of reducing the load on the operator and shortening the transmission processing time when transmitting the transaction data from the teller machine to the host computer.

To achieve the above object, the invention presents an automatic transaction system comprising a teller machine and a host computer connected to each other, in which the teller machine comprises input means for feeding the transaction data, registration means for registering the transaction data in response to the output of the input means, and shunt means for temporarily shunting the transaction data to be transmitted to the host computer, and the host computer selectively delivers a request signal for requesting a specific operation at the teller machine in response to a predetermined transaction data which is transmitted from the teller machine, whereas at the teller machine, the processing operation is stopped until execution of the specific operation when this request information is received, wherein state of stopping or executing the processing operation when receiving the request information is selectively set.

In the automatic transaction system of the invention, when the transaction data is transmitted from the teller machine to the host computer, the request information for requesting a specific operation at the teller machine is selectively delivered in response to the transaction data received. At the teller machine side, it is possible to set so as not to stop the processing operation until execution of the specific operation when receiving such request information, and when set in this state, the operator does not have to respond to the request information from the host computer, so that the controllability may be enhanced, while the transmission processing time can be shortened.

The invention further presents (a) a teller machine which comprises:

(a1) input means for feeding transaction data, (a2) entry means for registering transaction data in response to the output of the input means, (a3) shunt means for temporarily storing part or all of the transaction data registered in the entry means, (a4) first transmission operation means, (a5) first transmission means for transmitting the transaction data registered in the entry means in response to the output of the first transmission operation means, (a6) second transmission operation means, and (a7) second transmission means for transmitting all of transaction data stored in the shunt means in response to the output of the second transmission operation means; and also to (b) a host computer which comprises:

(b1) receiving means for receiving the transaction data from the first and second transmission means, and (b2) transmission means for transmitting the request information requesting a specific operation when predetermined transaction data is received out of the transaction data from the second transmission means, in response to the output of the receiving means, wherein
the teller machine further comprises
(a8) operation means for selection, and
(a9) control means for stopping or executing the processing action for activating the input means by execution of the specific operation, for suspending the input means until the specific operation requested by the request information is executed when the request information is received, in response to the output of the operation means for selection.

According to the invention, the transaction data registered in the entry means is transmitted to the host computer by pressing the first transmission operation means. The transaction data stored temporarily in the shunt means is transmitted to the host computer by manipulating the second transmission operation means. At the host computer, when the predetermined transaction data out of the transaction data from the second transmission means is received, the request signal for requesting a specific operation is transmitted to the teller machine.

In the teller machine, the processing action of the control means is stopped or executed by the manipulation of the operation means for selection. The processing action of the control means is the action for activating the input means by execution of the specific operation, for suspending the input means until the specific operation requested by the request signal is executed when the request signal is received from the host computer.

When such processing action is executed in response to the output of the operation means for selection, the input means is suspended until the specific operation is executed when the request information is received. On the other hand, when the processing action is stopped by the operation means for selection, the input means may be always activated without executing the specific operation when receiving the request information. Therefore, by setting so as to stop the processing action, it is not necessary to respond to the request information from the host computer, and the burden of the operator may be alleviated, while the transmission processing time may be shortened.

In a preferred embodiment of the invention, the host computer transmits request information when predetermined transaction data out of the transaction data registered in the entry means is received, whereas, in response thereto, at the teller machine, the processing action of the control means is executed when the request information is received.

In a further preferred embodiment of the invention, the teller machine further comprises means for visually displaying or printing the transaction data stored in the shunt means, and visually displaying or printing the recognition information for discriminating the transaction data receiving the request information from the host computer when the processing action is stopped by the operation means for selection.

Therefore, after all transaction data stored in the save means is transmitted to the host computer, the transaction data receiving the request information from the host computer can be discriminated, which is very convenient.

BRIEF DESCRIPTION OF THE DRAWINGS

These and other objects of the invention, as well as the features and advantages thereof, will be better understood and appreciated from the following detailed description taken in conjunction with the drawings, in which.

DETAILED DESCRIPTION OF THE PREFERRED EMBODIMENTS

Referring now to the drawings, preferred embodiments of the invention are described in further details below.

Figure 1:
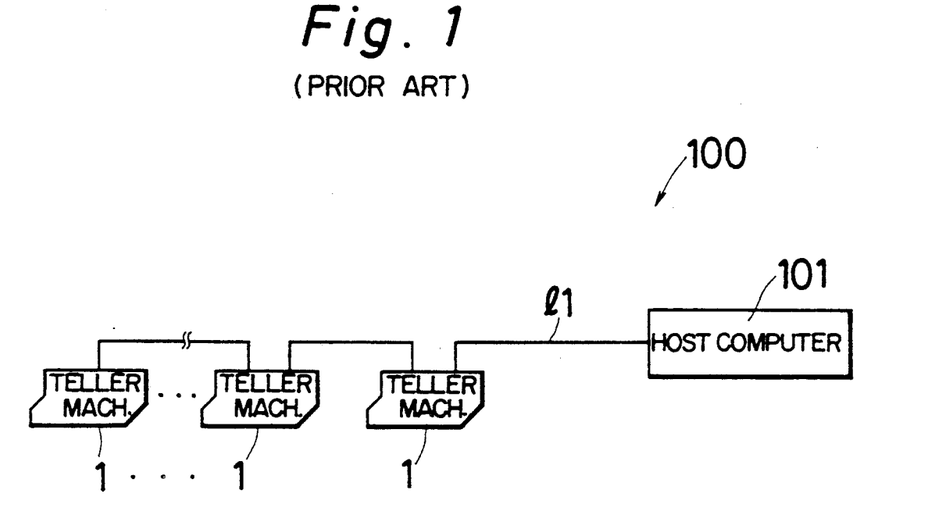
FIG. 1 is a block diagram showing an electric structure of an automatic transaction system 100 in one of the embodiments of the invention.

FIG. 1 is a block diagram showing an electrical block diagram of an embodiment of the invention. An automatic transaction system 100 shown thereat is composed of a host computer 101 and plural teller machines 1 as terminal units. Each teller machine 1 is connected to the host computer 101 through a common line 11, and the data is transmitted, for example, through a half-duplex channel.

Figure 2:
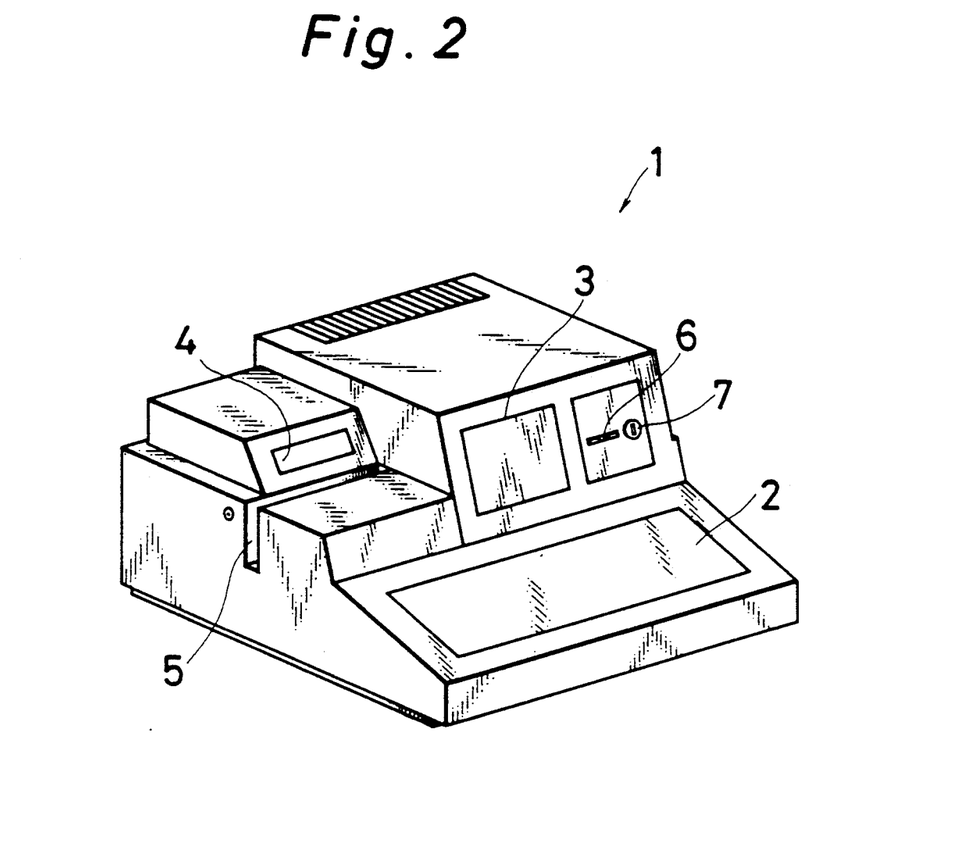
FIG. 2 is a perspective view showing the appearance of a teller machine 1.

FIG. 2 is a perspective view showing the appearance of a teller machine 1. The teller machine 1 comprises a keyboard 2, a display unit 3, a window 4 for visually showing the bank's copy or the journal, and a slip inlet 5 for printing the slip. At the right side of the display unit 3, a knob 6 for controlling the brightness of the display unit 3 and a mode switch 7 described later are disposed.

Figure 3:
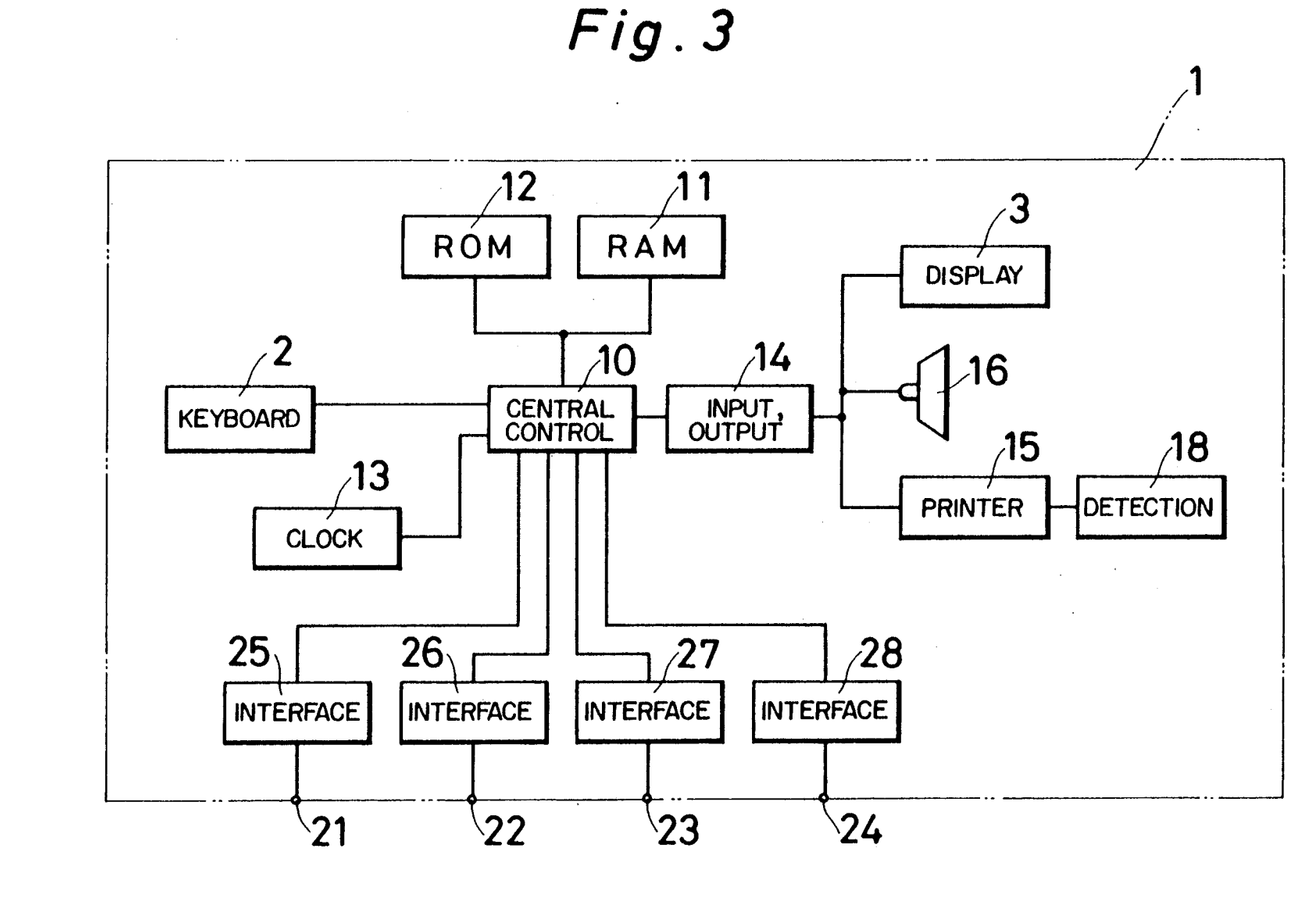
FIG. 3 is an electric block diagram showing an embodiment of a teller machine 1.

FIG. 3 is a block diagram showing the electric components of the teller machine 1. The teller machine 1 comprises a central processing unit (CPU) 10 for electrically controlling the entire machine. To this central processing unit 10 are connected a random access memory (RAM) 11 and a read-only memory (ROM) 12, a clock signal generator circuit 13 and the keyboard 2. This central processing unit 10 is further combined with a printing device 15 for printing various articles through input and output circuit 14, a speaker 16 for issuing, for example, beeping sound, and the display unit 3. The printing device 15 comprises a detector circuit 18 for detecting whether the slip to be printed is at normal loading position or not.

This teller machine 1 has connection terminals 21 to 24 to be connected with, for example, MCR (magnetic card reader), MICR (magnetic ink character reader), MICR printer, OCR (optical character reader) and external line (offline) with host computer 101. These terminals 21 to 24 are connected to the central control unit 10 through interfaces 25 to 28.

Figure 4:
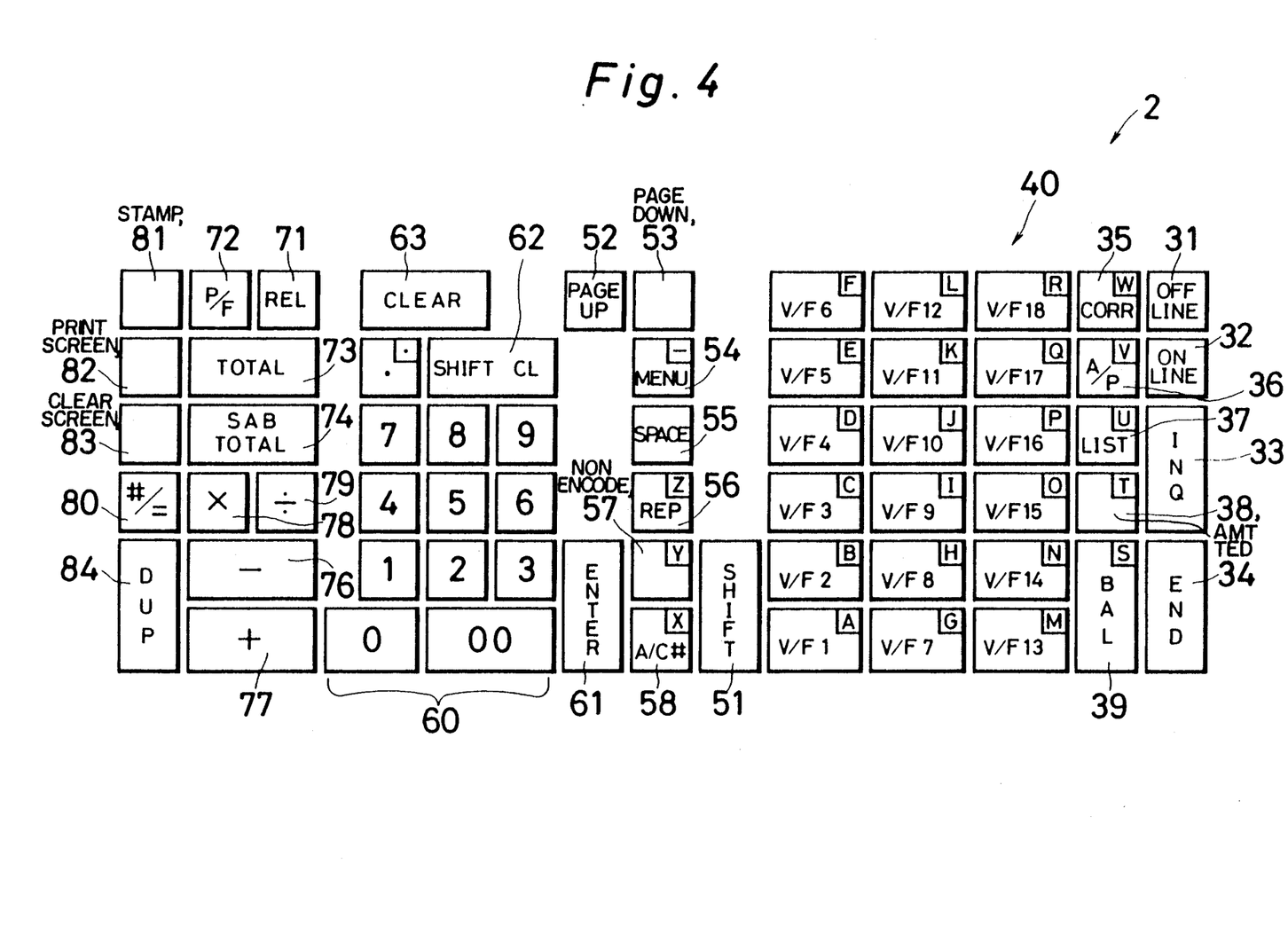
FIG. 4 is a plan view of a keyboard 2.

FIG. 4 is a plan view of the keyboard 2. Referring to FIG. 4, the function of each input key is explained below.

An offline key 31 and an online key 32 are the keys for selectively setting the offline mode or online mode. An INQ key 33 is used for inquiring the data to the host computer 101. An END key 34 is used when terminating the registration procedure. A CORR key 35 is used when correcting the already entered data. Whether a journal is printed or not is selected by an A/P key 36. A LIST key 37 and an AMTTED key 38 are used to set the list mode and amount tendered mode. A BAL key 39 is used when calculating the balance.

A function key group 40 comprises, for example, 18 function keys. The function keys are assigned with registration functions for cash paid in, cash paid out, exchange to foreign currency, exchange to domestic currency, and others. A shift key 51 is used, for example, when entering alphabetical letters assigned as second functions to each key of function key group 40.

A page up key 52 and a page down key 53 are used for feeding forward or backward the pages of the list displayed on the display unit 3. When a menu key 54 is pressed, the menu of various predetermined programs is displayed on the display unit 3. A space key 55 is used for providing a space when entering data.

The amount entered by a numeric key group 63 is repeatedly entered/displayed by pressing on REP key 56. A NON ENCODE key 57 is for selecting temporary cancellation of amount printing to the MICR printer. When entering an account number, the operations of the numeric key group 60 and the A/C# key 58 are combined. The programs displayed on the display unit 3 by the menu key 54 are selected by the combination of operations of numeric key group 60 and ENTER key 61. A SHIFT CL key 62 is used, for example, when erasing the lowest digit of the amount entered by the numeric key group 60. A CLEAR key 63 is used, for example, when erasing the amount entered by the numeric key group 60 or cancelling the error state.

A REL key 71 is used, for example, when cancelling the list mode set by the LIST key 37, or erasing the account number being entered. A P/F key 72 is used for feeding the journal without printing. A total key 73 is for clearing the result of operation calculated by a subtotal key 74 shown below. And the subtotal key 74 is used for calculating the result of operation performed by subtraction key 76 and addition key 77. The result of operation by multiplication key 78 and division key 79 is calculated by an equal key 80.

A stamp key 81 is used for printing predetermined symbol or character on the journal or slip. A print screen key 82 is used when printing out the data presently shown in the display unit 3. A clear screen key 83 is used for erasing the data shown in the display unit 3. A DUP key 84 is used when duplicating the data, such as the amount (and account number), on the slip.

The function keys in the function key group 40 (hereinafter generally called function key F) are preliminarily assigned with various functions corresponding to the predetermined transaction type, such as the cash paid-out registration function for registering the cash paid out, the cash paid-in registration function for registering the cash paid in, and the change registration function for registering the change. The function key F can be preliminarily assigned with a sign corresponding to the predetermined transaction type, such as the plus sign or minus sign. For example, the function key F having the cash paid-in registration function is assigned with the plus sign, and the function key F having the cash paid-out registration function is assigned with the minus sign.

Figure 5:
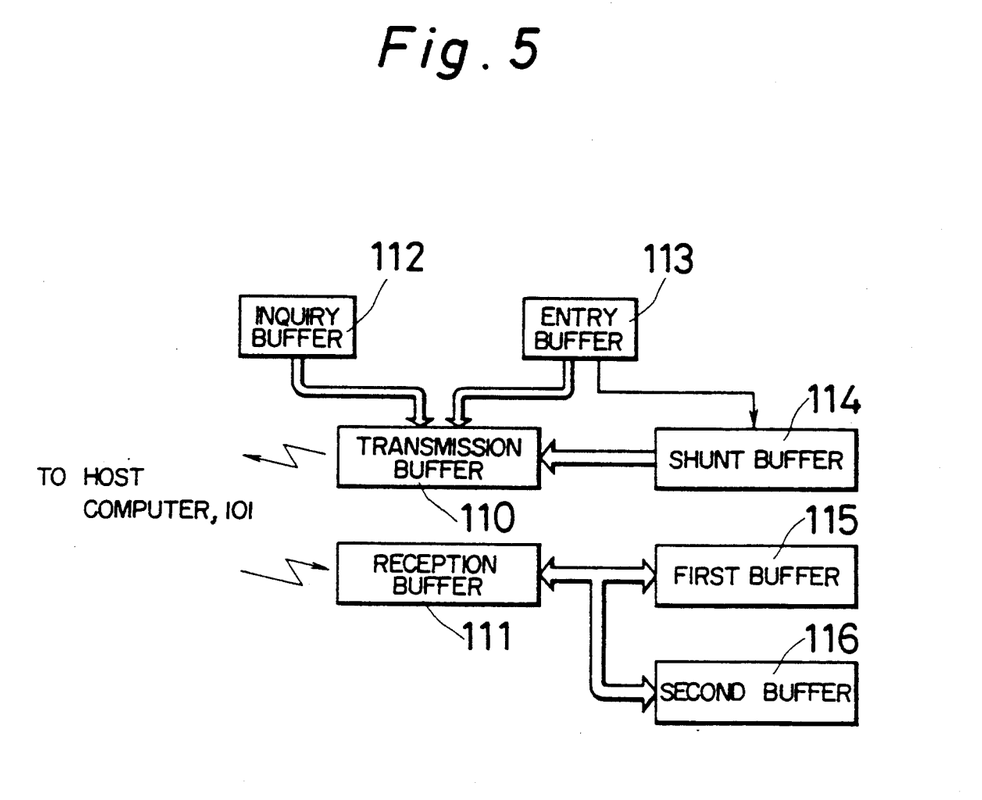
FIG. 5 is a block diagram showing the composition for transmitting the data stored in the entry means and shunt means of the teller machine to the host computer, and the composition for receiving the request signal from the host computer.

FIG. 5 is a block diagram showing the arrangement for transmitting the information stored in the entry means and shunt means of the teller machine 1 to the host computer 101, and the arrangement for receiving the request information from the host computer 101.

A transmission buffer 110 in which the data to be transmitted to the host computer 101 is stored is connected with an inquiry buffer 112, an entry buffer 113 and a shunt buffer 14 as described below.

In the inquiry buffer 112, the inquiry data of which content must be inquired to the host computer, for example, the account number, is stored. The inquiry data stored in this inquiry buffer 112 is transferred to the transmission buffer 110 by the pressing operation of the INQ key 33.

In the entry buffer 113, the registered data to be sent to the host computer 101, that is, the data registered by the pressing operation on the function key F predetermined to transmit to the host computer 101 is stored. The registered data stored in the entry buffer 113 is transferred to the transmission buffer 110 by the pressing operation on the END key 34.

The transmission data from the host computer 101 is received by the receiving buffer 111, and is selectively transferred to the first buffer 115 or second buffer 116.

The teller machine 1 is usually working in the online mode, and the transaction data registered is transmitted at the end of a transaction to the host computer 101. However, when the customers are crowded at the counter and it is desired to shorten the processing time even very slightly, or when the line leading to the host computer 101 is down, it is necessary, not often, to process the registration in offline mode.

In the offline mode the transaction data registered is sequentially transferred, by a data re-entry operation, from the entry buffer 113 to the shunt buffer 114, and is then transmitted to the host computer 101 through the transmission buffer 110. As to the type of data re-entry, either an automatic re-entry mode or the manual re-entry mode is selectively set at the teller machine 1.

In the automatic re-entry mode, in response to various readout command information from the host computer 101, the transaction data stored in the shunt buffer 114 is sequentially transmitted to the host computer 101, while the transaction serial number relating to the transaction data is printed on the journal.

The host computer 101, when receiving the transaction data from teller machine, sends out a response signal to the transaction data to the teller machine 1. This response signal is received in the reception buffer 111, and is transferred to the second buffer 116. The information of this response signal includes, sometimes, a command requesting a so-called key wait to the teller machine 1. At the teller machine 1, the following initial setting can be made with respect to the processing procedure in the case of reception of the response signal including the key wait request command in the automatic re-entry mode.

That is, in the initial setting, either the key wait code "0" or the key wait code "1" is selectively set at the teller machine 1. When the key wait code "0" is initially set, in the case of reception of a response signal including the key wait request command, the action of transmitting the subsequent data is prohibited until a predetermined key, such as the clear key 63 is pressed. On the other hand, when the key wait code "1" is set, without the key wait, the action of transmitting the subsequent data can be continued. In this case, therefore, without having to press the predetermined specific key, in response to the key wait request command, the action of transmitting data can be executed.

For example, when the transmission data sent out from the teller machine 1 does not compose the predetermined format completely, the host computer 101 sends out a response signal containing a key wait request command. At the teller machining 1 receiving this, in the case of key wait code "0" setting, "REJECT" appears in the display unit, and the transmission operation is prohibited until the clear key 63 is pressed. In the case of key wait code "1" setting when receiving the response signal containing the key wait request command, the transmission operation can be continued without having to press the clear key 63. Therefore, when the key wait code "1" is set, the load of the operator is outstandingly reduced in the automatic re-entry mode.

Figure 6:
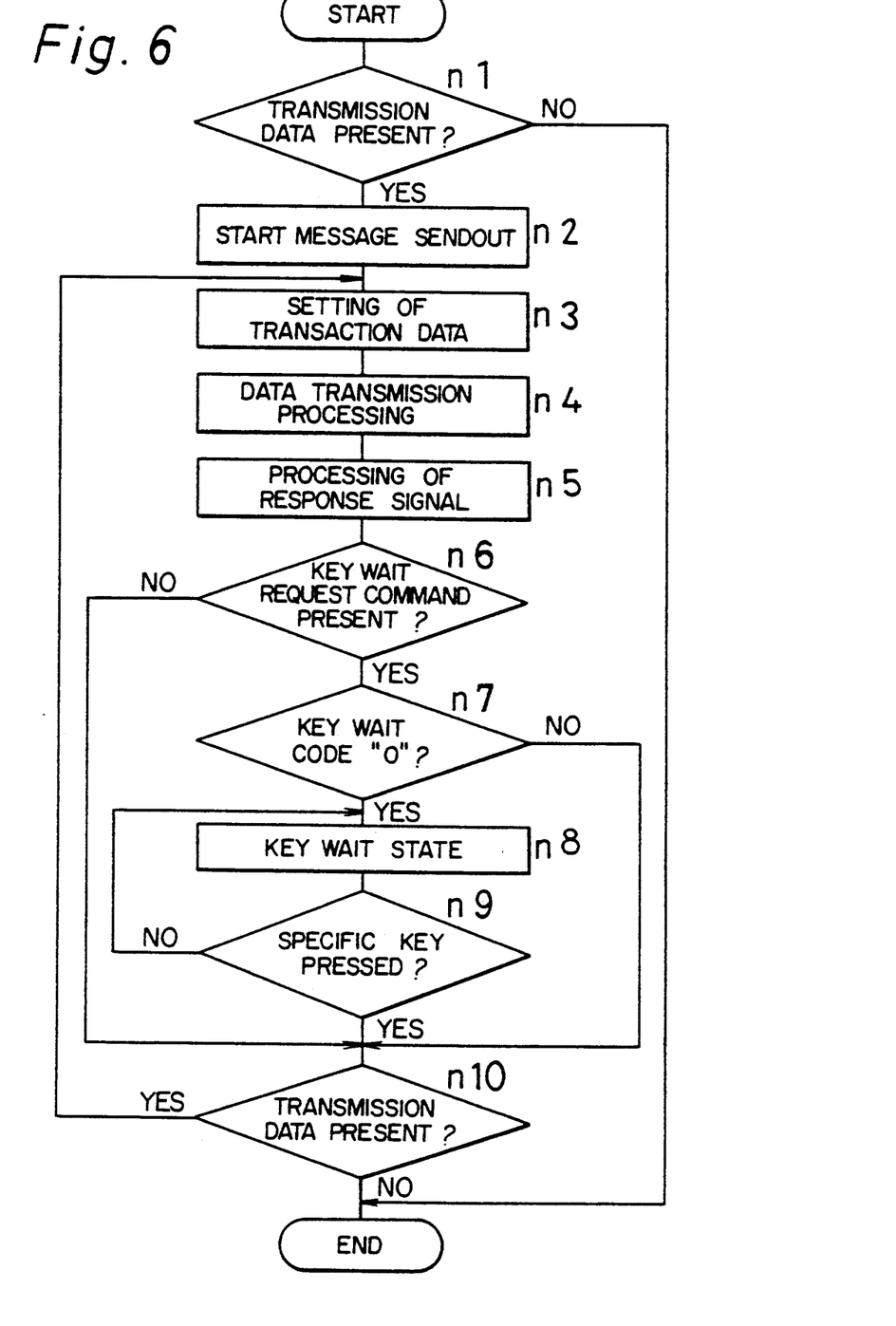
FIG. 6 is a flow chart explaining the operation of the teller machine.

FIG. 6 is a flow chart for explaining the operation.

At step n1, it is determined whether the data is stored or not in the shunt buffer 114, and if stored, at step n2, a start message for starting transmission of the data stored in the shunt buffer 114 is sent out from the teller machine 1 to the host computer 101.

At step n3, a set of transaction data stored in the shunt buffer 114 is set in the transmission buffer 110, and the data transmission processing is done at step n4. That is, the data stored in the transmission buffer 110 is transmitted to the host computer 101, and in response thereto a response signal from the host computer 101 is received. At step n5, the processing corresponding to the response signal is carried out at the teller machine 1 side.

At step n6, it is determined whether a key wait request command is contained or not in the received response signal, and if contained, at step n7, it is judged whether the key wait code "0" is set or not in the teller machine 1. If the key wait code "0" is set, at step n8, the operation of a predetermined specific key, for example, clear key 63 is waited for. Unless the specific key is pressed at step n9, the operation returns to step n8, and when the specific key is pressed, the operation advances to step n10.

At step n10, it is judged whether the data is stored or not in the shunt buffer 114, and if stored, the operation returns to step n3, and otherwise the operation is terminated.

In the case of absence of key wait request command at step n6 or in the case of key wait code "1" setting at step n7, the operation advances to step n10. Meanwhile, if the negative judgement is made at step n1, the operation is terminated.

In this way, even if the key wait request command is included in the response signal from the host computer 101, the subsequent data can be transmitted, as far as the key wait code "1" has been set, without having to carry out the processings at steps n8 and n9, that is, the so-called key wait process, so that the controllability may be superbly enhanced. Incidentally, as for the transmission data in the case of key wait request, the recognition symbol, for example, "REJECT" capable of discriminating is printed on the journal. Therefore, even after the end of this data transmission process, the data with key wait request can be easily retrieved by checking the journal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An automatic transaction system comprising:
   a teller machine and a host computer connected to each other,
   said teller machine being operable in an on-line and off-line mode and including,
   input means for feeding in predetermined transaction data,
   entry means for registering said transaction data received from said input means, and
   means for temporarily storing said transaction data during said off-line mode prior to being transmitted to the host computer,
   said host computer additionally including, means for transmitting a predetermined request command signal to said teller machine when in the off-line mode for requesting a predetermined operation at the teller machine in response to said predetermined transaction data transmitted thereto from said teller machine,
   said teller machine additionally including means for selectively being set in a first and a second operating state, said teller machine responding to said request command signal when said first operational state is set to inhibit transmission of data to said host computer until a predetermined operation is performed by an operator and responding to said request command signal when said second operational state is set to permit transmission of data to said host computer without any operation being performed by said operator.

2. An automatic transaction system of claim 1 wherein said request command signal comprises a key wait signal.

3. An automatic transaction system of claim 2 wherein said means for selectively being set includes keying means for selecting a first and a second key wait code.

4. An automatic transaction system of claim 3 wherein said predetermined operation comprises manually operating a key on a keyboard.

5. An automatic transaction system comprising:
   (a) a teller machine including,
   (a1) input means for feeding transaction data,
   (a2) entry means for registering transaction data in response to an output of the input means,
   (a3) shunt means for temporarily storing part or all of the transaction data registered in the entry means,
   (a4) first transmission control means for operating said teller machine in an on-line mode,
   (a5) first transmission means for transmitting the transaction data registered in the entry means in response to control signals generated by said first transmission control means,
   (a6) second transmission control means, for operating said teller machine in an off-line mode, and
   (a7) second transmission means for transmitting all of transaction data stored in the shunt means in response to control signals generated by said second transmission control means in said off-line mode, said first and second transmission means including a common data buffer, and
   (b) a host computer including, (b1) receiving means for receiving the transaction data from the common data buffer of said first and second transmission means, and (b2) transmission means for transmitting a command signal to said teller machine requesting a specific operation when predetermined transaction data is received from the second transmission means by said receiving means during said off-line mode, said teller machine further including, (a8) means for selectively being set in a first and a second operating state, said teller machine responding to said request command signal when said first operational state is set to inhibit transmission of data to said host computer until a predetermined operation is performed by an operator and responding to said request command signal when said second operational stat is set to permit transmission of data to said host computer without any operation being performed by said operator.

6. An automatic transaction system of claim 1 or 5, wherein the teller machine further includes means for visually displaying or printing the transaction data stored in the means for temporarily storing said transaction data, and visually displaying or printing data upon receipt of said request command signal from said host computer when set to said second operational state.

* * * * *